(12) United States Patent
Müller

(10) Patent No.: US 6,265,509 B1
(45) Date of Patent: Jul. 24, 2001

(54) CROSSLINKED POLYMERS

(75) Inventor: Beat Müller, Marly (CH)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/236,158

(22) Filed: Jan. 22, 1999

Related U.S. Application Data

(62) Division of application No. 08/875,535, filed on Jul. 30, 1997, now Pat. No. 5,932,674.

(51) Int. Cl.$^7$ ............................ C08J 234/02; C08J 220/58
(52) U.S. Cl. ........................... 526/266; 522/85; 522/86; 526/304; 525/59; 525/61; 525/57
(58) Field of Search ................................. 526/266, 304; 522/85, 86; 525/57, 59, 61

(56) References Cited

U.S. PATENT DOCUMENTS

| | | | |
|---|---|---|---|
| 4,670,506 | * | 6/1987 | Goldenberg et al. .................. 525/59 |
| 5,508,317 | * | 4/1996 | Muller ................................... 522/85 |

FOREIGN PATENT DOCUMENTS

| | | | |
|---|---|---|---|
| WO9624077 | * | 8/1996 | (WO). |
| WO9624078 | * | 8/1996 | (WO). |

* cited by examiner

*Primary Examiner*—David W. Wu
*Assistant Examiner*—Tanya Zalukaeva
(74) *Attorney, Agent, or Firm*—R. Scott Meece; Robert J. Gorman, Jr.

(57) ABSTRACT

The invention relates to a novel process for the production of mouldings, in particular contact lenses, in which a soluble prepolymer comprising units containing a crosslinkable group and at least one unit containing a modifier is crosslinked in solution, and to mouldings, in particular contact lenses, obtainable by this process. The present invention likewise relates to novel prepolymers which can be employed in the novel process, in particular derivatives of a polyvinyl alcohol having a molecular weight of at least about 2000 which comprises from about 0.5 to about 80%, based on the number of hydroxyl groups in the polyvinyl alcohol, of units of the formulae I and II, II and III or I, II and III, as disclosed in detail in the description, and to crosslinked polymers, either homopolymers or copolymers, made from these novel prepolymers, a process for the preparation of the novel prepolymers and the homopolymers and copolymers obtainable therefrom, to mouldings made from said homopolymers or copolymers, in particular contact lenses made from these homopolymers or copolymers, and to a process for the production of contact lenses using said homopolymers ox copolymers.

5 Claims, No Drawings

CROSSLINKED POLYMERS

This is a divisional of application Ser. No. 08/875,535, filed Jul. 30, 1997 U.S. Pat. No. 5,932,674.

The invention relates to a novel process for the production of mouldings, in particular contact lenses, in which a prepolymer comprising units containing a crosslinkable group and at least one unit containing a modifier is crosslinked in solution, and to mouldings, in particular contact lenses, which are obtainable by this process.

The present invention also relates to novel prepolymers which can be employed in this crosslinking process, in particular those based on starting polymers containing functional groups, for example hydroxyl groups, on the polymer chain or functional groups, for example imino groups, in the polymer chain or functional groups bonded to the polymer skeleton via a bridge, where these functional groups allow covalent bonds to compounds containing a crosslinkable modifier group or another modifier group. These starting polymers are, in particular, polyhydroxyl compounds having a 1,2- and/or 1,3-diol structure, such as polyvinyl alcohol, or hydrolysed copolymers of vinyl acetate, for example copolymers with vinyl chloride, N-vinylpyrrolidone, etc. The invention furthermore relates to crosslinked polymers, either homopolymers or copolymers, made from these novel prepolymers, to a process for the preparation of the novel prepolymers and the homopolymers and copolymers obtainable therefrom, to mouldings made from said homopolymers or copolymers, in particular contact lenses made from these homopolymers or copolymers, and to a process for the production of contact lenses using the said homopolymers or copolymers.

The starting polymers are, in particular, derivatives of polyvinyl alcohol or copolymers of vinyl alcohol which contain, for example, a 1,3-diol skeleton. The crosslinkable group or the further modifier can be bonded to the starting polymer skeleton in various ways, for example through a certain percentage of the 1,3-diol units being modified to give a 1,3-dioxane which contains a crosslinkable radical or a further modifier in the 2-position.

Another possibility is for a certain percentage of hydroxyl groups in the starting polymer to be esterified by means of an unsaturated organic acid, these ester-bonded radicals containing a crosslinkable group.

In the case of a radical which has been modified to give a 1,3-dioxane, the novel prepolymer is preferably a derivative of polyvinyl alcohol which has a mean molecular weight of at least about 2000 and comprises units which contain a crosslinkable group and a further modifier. The further modifier serves, inter alia, for weighting, which improves the mechanical properties of die moulding, and can contain, for example, an acid or base functionality.

Units containing a crosslinkable group conform, in particular, to the formula I

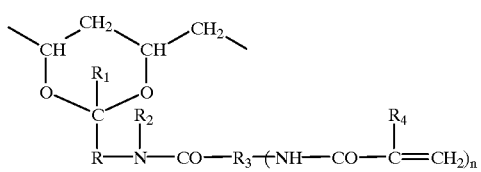

(I)

in which
R is a bivalent radical of a $C_1$–$C_{12}$alkane, $R_1$ is hydrogen, a $C_1$–$C_6$alkyl radical or a cycloalkyl radical,
$R_2$ is hydrogen or a $C_1$–$C_6$alkyl radical,

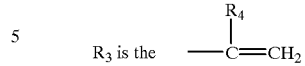

$R_3$ is the group if n=0, or the

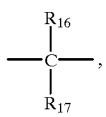

bridge if n=1,
$R_4$ is hydrogen or $C_1$–$C_4$alkyl,
n is zero or 1, preferably 0, and
$R_{16}$ and $R_{17}$, independently of one another, are hydrogen, $C_1$–$C_8$alkyl, aryl or cyclohexyl.

Units containing a further modifier conform, in particular, to the formula II

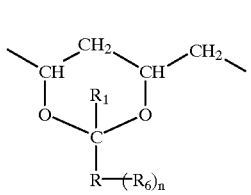

(II)

in which
$R_1$ is hydrogen, a $C_1$–$C_6$alkyl radical or a cycloalkyl radical,
$R_5$ is a monovalent or bivalent radical of a $C_1$–$C_8$alkane or a monovalent or bivalent radical of a $C_2$–$C_8$olefin,
$R_6$ is a group of the formula —(—NH—CO—$R_7$)$_o$($R_8$)$_p$ or —N($R_9$)$_2$,
$R_7$ is an unsubstituted or substituted monovalent or bivalent radical of a $C_1$–$C_8$alkane,
$R_8$ is a heterocyclic group,
$R_9$ is hydrogen or a $C_1$–$C_6$alkyl radical,
n is zero or 1, and
o and p, independently of one another, are zero or 1.

R in the formula I as a bivalent radical of a $C_1$–$C_{12}$alkane is a linear or branched radical, in particular a radical of methane, ethane, n- or isopropane, n-, sec- or tert-butane, n- or isopentane, hexane, heptane or octane. Preferred radicals contain one to four carbon atoms, in particular one carbon atom.

$R_1$ and $R_2$ in the formula I and $R_1$ and $R_9$ in the formula II as a $C_1$–$C_6$alkyl radical are, for example, a methyl, ethyl, propyl or butyl radical. $R_1$ and $R_2$ are preferably each hydrogen.

$R_4$ in the formula I as a $C_1$–$C_4$alkyl radical is, for example, an n-butyl, n- or isopropyl or ethyl radical, in particular a methyl radical.

$R_5$ in the formula II as a radical of a $C_2$–$C_8$olefin is a linear or branched radical, for example a radical of propene, 1-butene, 2-butene, methylpropene, 4-ethyl-2-hexene or 2-methylpentene.

$R_5$ in the formula II as a radical of a $C_1$–$C_8$alkane is a linear or branched radical, for example a radical of methane, ethane, n- or isopropane, n-, sec- or tert-butane, n- or isopentane, hexane, heptane or octane.

$R_7$ in the formula II as a monovalent or bivalent radical of a $C_1$–$C_8$alkane is a linear or branched radical, for example a radical of methane, ethane, n- or isopropane, n-, sec- or tert-butane, n- or isohexane, heptane or octane.

$R_8$ in the formula II as a heterocyclic group is, in particular, a radical of a five-membered heterocyclic ring containing one ring member other than carbon, such as —S—, —O— or —NH—, for example furan, thiophene, pyrrole, pyrrolidone, pyroglutamic acid, maleimides of the formula

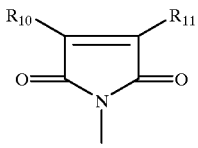

(in which $R_{10}$ and $R_{11}$, independently of one another, are hydrogen, $C_1$–$C_4$alkyl, in particular methyl, or aryl, such as phenyl, or halogen, such as F, Cl or Br, preferably hydrogen or methyl), coumarone, thiocoumarone or indole; a five-membered heterocylic ring containing two ring members other than carbon, such as —O—, —S— or —NH—, for example oxazole, isoxazole, thiazole, imidazole, hydantoin of the formula

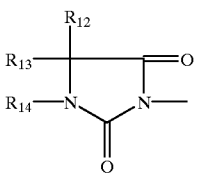

(in which $R_{12}$, $R_{13}$ and $R_{14}$, independently of one another, are hydrogen or a $C_1$–$C_6$alkyl group which is unsubstituted or monosubstituted or polysubstituted by, for example, COOH or COO($C_1$–$C_4$alkyl)) or pyrazole; a five-membered heterocyclic ring containing three or more ring members other than carbon, such as —O— or —NH—, for example furazan, 1,2,3-triazole, 1,2,4-triazole, 1,3,4-triazole or tetrazole; a six-membered heterocyclic ring containing one ring member other than carbon, for example —O—, —S— or —NH—, for example pyran, thiopyran, pyridine or quinoline; or a six-membered heterocyclic ring containing more than one ring member other than carbon, such as —N—, for example diazines, such as oiazine, miazine, dihydrouracil of the formula

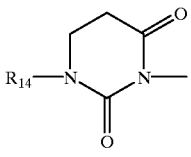

(in which $R_{14}$ is as defined above) or piazine, vicinal, asymmetrical or symmetrical triazine or 1,2,3,4-triazine, 1,2,3,5-triazine or 1,2,4,5-triazine.

Preferred heterocyclic groups are radicals of five-membered heterocyclic rings containing one ring member other than carbon, in particular —NH—, in particular those of maleimide and pyrrolidone.

$R_{16}$ and $R_{17}$ in the formula I as a $C_1$–$C_8$alkyl group are a linear or branched group, for example one of the following: octyl, hexyl, pentyl, butyl, propyl, ethyl, methyl, 2-propyl, 2-butyl or 3-pentyl. $R_{16}$ is preferably hydrogen or the $CH_3$ group, and $R_{17}$ is preferably a $C_1$–$C_4$alkyl group.

$R_{16}$ and $R_{17}$ as aryl are preferably phenyl.

All these groups can be monosubstituted or polysubstituted, examples of suitable substituents being the following: $C_1$–$C_4$alkyl, such as methyl, ethyl or propyl, —COOH, —OH, —SH, $C_1$–$C_4$alkoxy (such as methoxy, ethoxy, propoxy, butoxy or isobutoxy), —$NO_2$, —$NH_2$, —NH($C_1$–$C_4$alkyl), —NH—CO—$NH_2$, —N($C_1$–$C_4$alkyl)$_2$, phenyl (unsubstituted or substituted by, for example, —OH or halogen, such as Cl, Br or especially I), —S($C_1$–$C_4$alkyl), a 5- or 6-membered heterocyclic ring, such as, in particular, indole or imidazole, —NH—C(NH)—$NH_2$, phenoxyphenyl (unsubstituted or substituted by, for example, —OH or halogen, such as Cl, Br or especially I), an olefinic group, such as methylene or vinyl, and CO—NH—C(NH)—$NH_2$.

Preferred substituents are lower alkyl, which here, as elsewhere in this description, is preferably $C_1$–$C_4$alkyl, $C_1$–$C_4$alkoxy, COOH, SH, —$NH_2$, —NH($C_1$–$C_4$alkyl), —N($C_1$–$C_4$alkyl)$_2$ or halogen. Particular preference is given to $C_1$–$C_4$alkyl, $C_1$–$C_4$alkoxy, COOH and SH.

For the purposes of this invention, cycloalkyl is, in particular, cycloalkyl, and aryl is, in particular, phenyl, unsubstituted or substituted as described above.

If the radical involved is bonded via an ester group and contains a crosslinkable group, the novel prepolymer is preferably a derivative of a polyvinyl alcohol having a mean molecular weight of at least about 2000 which comprises units of the formula III

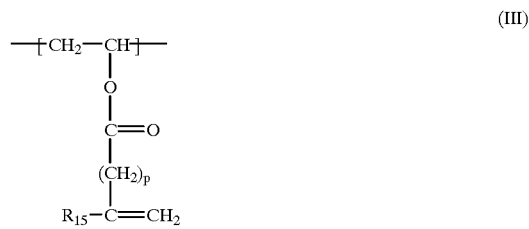

in which $R_{15}$ is hydrogen or a $C_1$–$C_4$alkyl group, in particular $CH_3$, and p is from zero to 6, preferably zero.

Contact lenses based on polyvinyl alcohol have already been disclosed For example, EP 216 074 discloses contact lenses comprising polyvinyl alcohol containing (meth) acryloyl groups bonded via urethane groups. EP 189 375 describes contact lenses comprising polyvinyl alcohol crosslinked by means of polyepoxides.

Furthermore, some specific acetals containing crosslinkable groups have also already been disclosed. In this connection, we refer, for example, to EP 201 693, EP 215 245 and EP 211 432. EP 201 693 describes, inter alia, acetals of unbranched aldehydes having 2 to 11 carbon atoms carrying a terminal amino group which is substituted by a $C_3$–$C_{24}$olefinically unsaturated organic radical. This organic radical contains a functionality which withdraws electrons from the nitrogen atom, and furthermore the olefinically unsaturated functionality is polymerizable. EP 201 693 also claims products of the reaction of the acetals characterized above with a 1,2-diol, a 1,3-diol, a polyvinyl alcohol or a cellulose. However, such products are not described directly.

If one of the acetals of EP 201 693 is mentioned at all in connection with, for example, polyvinyl alcohol, as is the case, inter alia, in Example 17 of that patent application, the acetal which can be polymerized via its olefinic group is first copolymerized with, for example, vinyl acetate. The resultant copolymer is then reacted with polyvinyl alcohol, and an emulsion having a solids content of 37%, a pH of 5.43 and a viscosity of 11,640 cps is obtained. However, none of these references describes a combination of a crosslinkable group and an additional modifier, especially on a polyvinyl alcohol, polyvinyl acetate or a copolymer of vinyl acetate and vinylpyrrolidone.

The novel prepolymers have, in particular, a mean molecular weight of at least about 2000 and comprise from about 0.5 to about 80%, in particular from about 1 to 50%, further preferably from about 1 to 25%, preferably from about 2 to 15%, particularly preferably from about 2 to 10%, based on the number of functional groups, for example hydroxyl groups of the polyvinyl alcohol, are units of the formula I, II and/or III. The novel prepolymers intended for the production of contact lenses comprise, in particular, from about 0.5 to about 25%, in particular from about 1 to 15%, particularly preferably from about 2 to 12%, based on the number of functional groups, for example hydroxyl groups of the polyvinyl alcohol, of units of the formula I, II and/or III.

The starting polymers preferably have a mean molecular weight of at least 2000. The upper limit to their mean molecular weight is up to 1,000,000. They preferably have a mean molecular weight of up to 300,000, in particular of up to 100,000, very particularly preferably of up to about 50,000.

Starting polymers which are suitable for the purposes of the invention, in particular polyvinyl alcohols, usually have principally a 1,3-diol structure. However, they can also contain hydroxyl groups in the form of 1,2-glycols, such as copolymer units of 1,2-dihydroxyethylene, as can be obtained, for example, by alkaline hydrolysis of vinyl acetate-vinylene carbonate copolymers.

In addition, the starting polymers derivatized in accordance with the invention, in particular polyvinyl alcohols, can also contain small proportions, for example of up to 20%, preferably of up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol, styrene or similar comonomers usually used.

Polyvinyl alcohols (PVA) which can be used as starting polymers are commercially available polyvinyl alcohols, for example Vinol® 107 from Air Products (MW=22,000 to 31,000, 98–98.8% hydrolysed), Polysciences 4397 (MW=25,000, 98.5% hydrolysed), BF 14 from Chan Chun, Elvanol® 90-50 from DuPont and UF-120 from Unitika. Other producers are, for example, Nippon Gohsei (Gohsenol®), Monsanto (Gelvatol®), Wacker (Polyviol®) or the Japanese producers Kuraray, Denki and Shin-Etsu. However, it is advantageous to use Mowiol® products from Hoechst, in particular those of the 3-83, 4-88, 4-98, 6-88, 6-98, 8-88, 8-98, 10-98, 20-98, 26-88 and 40-88 type.

The PVAs are prepared by basic or acidic, partial or virtually complete hydrolysis of polyvinyl acetate.

As mentioned above, it is also possible to use copolymers of hydrolysed or partially hydrolysed vinyl acetate, which are obtainable, for example, as hydrolysed ethylene-vinyl acetate (EVA), or vinyl chloride-vinyl acetate, N-vinylpyrrolidone-vinyl acetate and maleic anhydride-vinyl acetate.

If the starting polymers are, for example, copolymers of vinyl acetate and vinylpyrrolidone, it is again possible to use commercially available copolymers, for example the commercial products available under the name Luviskol® from BASF.

Particular examples are Luviskol VA 37 HM, Luviskol VA 37 E and Luviskol VA 28.

If the starting polymers are polyvinyl acetates, Mowilith 30 from Hoechst is particularly suitable.

Polyvinyl alcohol is usually prepared by hydrolysis of the corresponding homopolymeric polyvinyl acetate. In a preferred embodiment, the polyvinyl alcohol derivatized in accordance with the invention comprises less than 50% of polyvinyl acetate units, in particular less than 20% of polyvinyl acetate units. Preferred amounts of residual acetate units in the polyvinyl alcohol derivatized in accordance with the invention are, based on the total amount of vinyl alcohol units and acetate units, from about 2 to 20%, preferably from about 2 to 16%, in particular from 2 to 12%, especially from 0.5 to 3%.

The molecular weights are determined by gel permeation chromatography (GPC) [size exclusion chromatography—SEC] using DMF as solvent and are relative, unless stated otherwise, to polymethyl methacrylate (PMMA) as calibration standard.

A polyvinyl alcohol comprising units of the formula I and/or II can be prepared in a manner known per se. For example, a polyvinyl alcohol having a mean molecular weight of at least about 2000 which comprises units of the formula IV

can be reacted with from about 0.5 to 80%, based on the number of hydroxyl groups in the compound of the formula IV, of a compound of the formula V

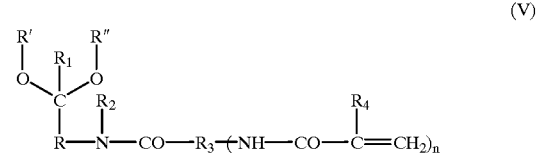

and a compound of the formula VI

in which R' and R", independently of one another, are hydrogen, lower alkyl or lower alkanoyl, such as acetyl or propionyl, and the other symbols are as defined under the formulae I and II, in a one-pot process, in particular in an acidic medium.

The acetals and ketals can also be replaced by the corresponding aldehydes and ketones.

A polyvinyl alcohol comprising units of the formula III can likewise be obtained in a manner known per se by reacting, for example, a polyvinyl alcohol having a mean molecular weight of at least about 2000 which comprises units of the formula IV

with from about 0.5 to 80%, based on the number of hydroxyl groups, of a compound of the formula VII

in which the symbols $R_{15}$ and p are as defined under the formula III, in particular in an acidic medium.

Some compounds analogous to compounds of the formulae V, VI and VII are known, and these can therefore be prepared in a manner known per se.

For example, the compounds of the formula V where n=zero are obtained, by reacting a compound of the formula VIII

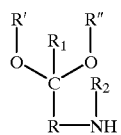 (VIII)

in which the symbols are as defined under the formula V, with a compound of the formula IX Hal—CO—R$_3$ (IX)

in an alkaline medium in the presence of a free-radical inhibitor. Hal in the formula IX is halogen, in particular F, Cl or Br, especially Cl.

Examples of compounds of the formula VIII are aminoacetaldehyde dimethyl acetal and ω-aminobutyraldehyde diethyl acetal.

Examples of compounds of the formula IX are acryloyl chloride and methacryloyl chloride.

Compounds of the formula V in which n=1 are prepared, for example, from a compound of the formula VIII by reaction with an azalactone of the formula X

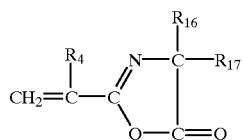 (X)

for example 4,4-dimethyl-2-vinyl-4H-oxazol-5-one, where the symbols $R_4$, $R_{16}$ and $R_{17}$ in formula X are as defined under the formula I.

The compounds of the formula VI are, per se, already starting materials for the preparation of compounds of the formula II, such as ω-aminobutyraldehyde diethyl acetal, crotonaldehyde and butyraldehyde, or can be obtained, for example, by reacting compounds of the formula XI

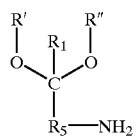 (XI)

for example aminoacetaldehyde dimethyl acetal or ω-aminobutyraldehyde diethyl acetal, with a compound which introduces the group $R_6$, such as dimethylmaleic anhydride, dimethylmaleimidylacetyl chloride, acetic anhydride, isobutyryl chloride, succinic anhydride, itaconic anhydride, trimellitic anhydride, sultone or methyl mercaptopropionate or by reacting a compound of the formula V in which n is 0 with, for example, pyrrolidone.

Surprisingly, the prepolymers comprising units of the formulae I, II and/or III are extremely stable. This is unexpected to the person skilled in the art since higher-functional acrylates, for example, usually require stabilization. If such compounds are not stabilized, rapid polymerization usually occurs. However, spontaneous crosslinking due to homopolymerization does not occur with the novel prepolymers. The prepolymers of the formulae I, II and III can, in addition, be purified in a manner known per se, for example by precipitation with acetone, dialysis or ultrafiltration, particular preference being given to ultrafiltration. This purification operation allows the prepolymers of the formulae I, II and III to be obtained in extremely pure form, for example as concentrated aqueous solutions, which are free or at least substantially free from reaction products, such as salts, and starting materials, or other non-polymeric constituents.

The preferred method for the purification of the novel prepolymers, ultrafiltration, can be carried out in a manner known per se. It is possible to carry out the ultrafiltration repeatedly, for example from two to ten times. Alternatively, the ultrafiltration can also be carried out continuously until the desired degree of purity has been achieved. The desired degree of purity can in principle be as great as desired. A suitable measure of the degree of purity is, for example, the sodium chloride content of the solution, which can easily be determined in a manner known per se, or GPC.

In addition to the units of the formulae I, II and III, the novel water-soluble, crosslinkable prepolymers can also comprise further modifier units. Of the many possibilities for such modifiers, the following are mentioned by way of example:

Further units containing crosslinkable groups are, for example, those of the formulae A and B

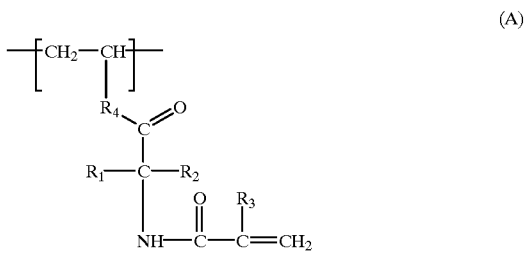 (A)

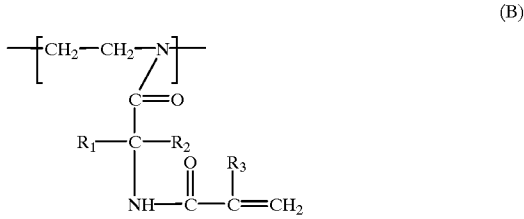 (B)

in which $R_1$ and $R_2$ embody amino acid radicals and are, independently of one another: hydrogen, a $C_1$–$C_8$alkyl group, an aryl group or a cyclohexyl group, these groups being unsubstituted or monosubstituted or polysubstituted, $R_3$ is hydrogen or a $C_1$–$C_4$alkyl group, and $R_4$ is an —O— or —NH— bridge.

Units which contain a bound photoinitiator are, in particular, those of the formula C

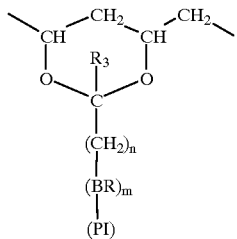

in which
BR is an —NH—CO—(CH$_2$)$_o$— or

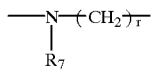

bridge or a quaternary salt thereof which has the formula

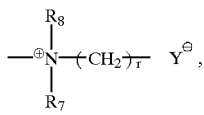

PI is the radical of a photoinitiator from the class consisting of the benzoins, such as benzoin ethers, for example benzoin methyl ether, benzoin ethyl ether, benzoin isopropyl ether and benzoin phenyl ether, and benzoin acetate; acetophenones, such as acetophenone, 2,2-dimethoxyacetophenone and 1,1-dichloroacetophenone; benzil, benzil ketals, such as benzil dimethyl ketal and benzil diethyl ketal; anthraquinones, such as 2-methylanthraquinone, 2-ethylanthraquinone, 2-tert-butyl anthraquinone, -chloroanthraquinone and 2-amylanthraquinone; furthermore benzophenones, such as benzophenone and 4,4'-bis(N,N'-dimethylamino) benzophenone; thioxanthones and xanthones; acridine derivatives, phenazine derivatives; quinoxaline derivatives; and 1-aminophenyl ketones and in particular 1-hydroxyphenyl ketones, in particular those of the formula

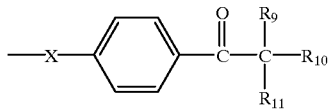

in which
X is —O—, —S— or —N(R$_{12}$)—,
Y is a counterion, such as H$_2$SO$_4^\ominus$, F$^\ominus$, Cl$^\ominus$, Br$^\ominus$, I$^\ominus$, CH$_3$COO$^\ominus$, OH$^\ominus$, BF$_4^\ominus$ or H$_2$PO$_4^\ominus$,
R$_3$ is hydrogen, a C$_1$–C$_6$alkyl group or a cycloalkyl group,
R$_7$ is hydrogen; unsubstituted or substituted, linear or branched C$_1$–C$_{12}$alkyl; the
—(CH$_2$)$_r$—PI group or the —CO—R$_{13}$ group, in which R$_{13}$ is linear or branched C$_1$–C$_6$alkyl which is unsubstituted or substituted by —COOH or acrylamide, or an unsubstituted, linear or branched radical of a C$_3$–C$_8$olefin,
R$_8$ is hydrogen, or unsubstituted or substituted, linear or branched C$_1$–C$_4$alkyl so long as
R$_7$ is not —CO—R$_{13}$,
R$_9$ is unsubstituted or substituted, linear or branched C$_1$–C$_6$alkyl, unsubstituted or substituted, linear or branched C$_1$–C$_6$alkoxy, a 6membered carbocyclic or heterocyclic ring, or an unsubstituted linear or branched radical of a C$_3$–C$_8$olefin,
R$_{10}$ is a group of the formula —OR$_{14}$ or

R$_{11}$ is unsubstituted or substituted, linear or branched C$_1$–C$_6$alkyl, a 6-membered carbocyclic or heterocyclic ring, an unsubstituted, linear or branched radical of a C$_3$–C$_8$olefin, or aryl, where
R$_9$ and R$_{11}$ together can also be cyclized to form a 5- or 6-membered carbocyclic ring,
R$_{12}$ is hydrogen or unsubstituted, linear or branched C$_1$–C$_4$alkyl,
R$_{14}$ is hydrogen or unsubstituted or substituted, linear or branched C$_1$–C$_4$alkyl,
R$_{15}$ and R$_{16}$, independently of one another, are unsubstituted, linear or branched C$_1$–C$_4$alkyl, or R$_{15}$ and R$_{16}$ can be bonded together to form a 5- or 6-membered heterocyclic ring,
m is 0 or 1,
n is a number from 1 to 12,
o is a number from 1 to 6, and
r is a number from 2 to 6,
where substituted radicals are substituted, in particular, by C$_1$–C$_4$alkyl or by C$_1$–C$_4$alkoxy, with the following provisos:
if the BR bridge is a quaternary salt, n is a number from 2 to 12;
R$_{14}$ is not hydrogen if R$_9$ is a C$_1$–C$_6$alkoxy radical; and
R$_7$ is —CO—R$_{13}$ when n=1.
Examples of units containing basic groups are those of the formula D

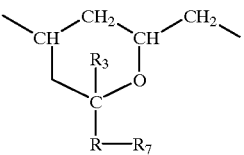

in which R is a linear or branched bivalent radical of a C$_1$–C$_{12}$alkane, and R$_3$ is hydrogen, a C$_1$–C$_6$alkyl group or a cycloalkyl group, and R$_7$ is a basic primary, secondary or tertiary amino group, in particular a secondary or ternary amino group which is substituted by C$_1$–C$_6$alkyl, or a quaternary amino group of the formula

in which R' is hydrogen or, independently of one another, a C$_1$–C$_{12}$alkyl radical, in particular a C$_1$–C$_4$alkyl radical, and X is a counterion, for example HSO$_4^\ominus$, F$^\ominus$, Cl$^\ominus$, Br$^\ominus$, I$^\ominus$, CH$_3$COO$^\ominus$, OH$^\ominus$, BF$^\ominus$ or H$_2$PO$_4^\ominus$.

Examples of units containing acidic groups are those of the formula E

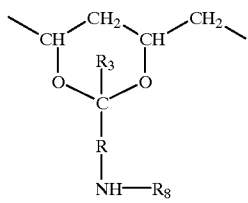
(E)

in which R and $R_3$ are as defined under the formula D, and $R_8$ is the radical of a monobasic, dibasic or tribasic aliphatic or aromatic, saturated or unsaturated organic acid.

Examples of units containing crosslinkable groups bonded via urethane or further modifier groups bonded via urethane are those of the formula F or G

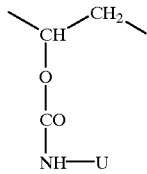
(F)

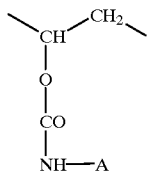
(G)

in which

U is the

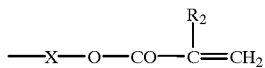

or —Y—NH—CO—O—Z—CH=$CH_2$ group,

X is a bridge having 2 to 12 n atoms, in particular an aliphatic, cycloaliphatic or aromatic bridge, especially alkylene, cyclohexylene or phenylene, which are unsubstituted or in particular substituted by lower alkyl, $R_2$ is hydrogen or a $C_1$–$C_4$alkyl group, Y is a bridge having 7 to 12 carbon atoms with the same preferences as for X, Z is a $C_2$- to $C_{12}$alkylene bridge, which may be interrupted once or more than once by oxygen atoms, and A is an organic radical having 1 to 18 carbon atoms, in particular an aliphatic, cycloaliphatic or aromatic radical, especially alkyl, cycloalkyl or phenyl, which are unsubstituted or in particular substituted by lower alkyl.

Examples of units containing a covalently bonded reactive dye radical are those of the formula H, I, J or K

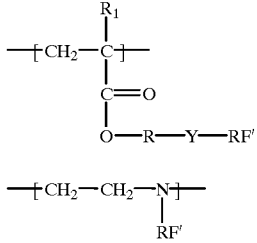
(H)

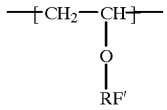
(I)

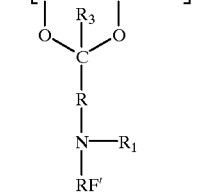
(J)

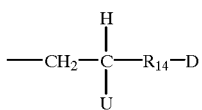
(K)

in which
RF' is a radical of the formula $$-CH_2-\underset{\underset{U}{|}}{\overset{\overset{H}{|}}{C}}-R_{14}-D$$

in which
D is the radical of an organic dye,
$R_{14}$ is a divalent electron-withdrawing group,
U is hydrogen or halogen,
R is the divalent radical of a $C_1$–$C_{12}$alkane,
$R_1$ is hydrogen or $C_1$–$C_4$alkyl,
$R_3$ is hydrogen, $C_1$–$C_6$alkyl or cycloalkyl, and
Y is —O— or —N($R_1$)—.

The novel prepolymers comprising units of the formula I, II or III and, if desired, one or more of the further modifier units described above are water-soluble and uncrosslinked, yet can be crosslinked in an extremely effective and targeted manner, for example by photocrosslinking, thermal crosslinking or 2+2 photocyclodimerization.

The main crosslinking process used is photocrosslinking in the presence or absence of an additional vinylic comonomer. The resultant polymers are insoluble in water.

In the case of photocrosslinking, it may be appropriate to add a photoinitiator which is capable of initiating free-radical crosslinking. The crosslinking can then be initiated by actinic or ionizing radiation.

The photocrosslinking is carried out in a suitable solvent. Such solvents are in principle all those which dissolve the prepolymer and any vinylic comonomers additionally used, for example water, alcohols, such as lower alkanols, for example ethanol or methanol, furthermore carboxamides, such as dimethylformamide or dimethyl sulfoxide, likewise mixtures of suitable solvents, for example mixtures of water with an alcohol, for example a water/ethanol or water/methanol mixture.

The photocrosslinking is preferably carried out directly from an aqueous solution of the novel prepolymers, which can be obtained as a result of the preferred purification step, namely ultrafiltration, if desired after addition of an additional vinylic comonomer. For example, the photocrosslinking can be carried out from an approximately 15 to 40% aqueous solution.

The process for the preparation of the novel crosslinked polymers comprises, for example, photocrosslinking a prepolymer comprising units of the formula I, II or III, in particular in essentially pure form, ie. for example, after a single or repeated ultrafiltration, preferably in solution, in particular in aqueous solution, in the presence or absence of an additional vinylic comonomer.

The vinylic comonomer which can additionally be used in the photocrosslinking can be hydrophilic, hydrophobic or a mixture of hydrophobic and hydrophilic vinylic monomers. Suitable vinylic monomers include, in particular, those which are usually used in the production of contact lenses. The term "hydrophilic vinylic monomer" is taken to mean a monomer which, as a homopolymer, typically gives a polymer which is soluble in water or is capable of absorbing at least 10% by weight of water. Analogously, the term "hydrophobic vinylic monomer" is taken to mean a monomer which, as a homopolymer, typically gives a polymer which is insoluble in water or is capable of absorbing less than 10 percent by weight of water.

In general, from about 0.01 to 80 units of a typical vinylic comonomer react per unit of formula I, II or III.

If a vinylic comonomer is used, the crosslinked novel polymers preferably comprise from about 1 to 15 percent, particularly preferably from about 3 to 8 percent, of units of the formulae I, II and/or III, based on the number of functional groups in the starting polymer, for example hydroxyl groups of the polyvinyl alcohol, which are reacted with from about 0.1 to 80 units of the vinylic monomer.

The proportion of vinylic comonomers, if used, is preferably from 0.5 to 80 units per unit of the formulae I and II and III, in particular from 1 to 30. units of vinylic comonomer per unit of the formulae I and II and III, particularly preferably from 5 to 20 units per unit of the formulae I and II and III.

It is furthermore preferred to use a hydrophobic vinylic comonomer or a mixture of a hydrophobic vinylic comonomer and a hydrophilic vinylic comonomer which comprises at least 50 percent by weight of a hydrophobic vinylic comonomer. This allows the mechanical properties of the polymer to be improved without drastically reducing the water content. However, both conventional hydrophobic vinylic comonomers and conventional hydrophilic vinylic comonomers are in principle suitable for the copolymerization with polyvinyl alcohol containing groups of the formula I.

Suitable hydrophobic vinylic comonomers include, without this being a comprehensive list, $C_1$–$C_{18}$alkyl acrylates and methacrylates, $C_3$–$C_{18}$alkylacrylamides and -methacrylamides, acrylonitrile, methacrylonitrile, vinyl $C_1$–$C_{18}$alkanoates, $C_2$–$C_{18}$alkenes, $C_2$–$C_{18}$haloalkenes, styrene, $C_1$–$C_6$alkylstyrene, vinyl alkyl ethers in which the alkyl moiety has 1 to 6 carbon atoms, $C_2$–$C_{10}$perfluoroalkyl acrylates and methacrylates and correspondingly partially fluorinated acrylates and methacrylates, $C_3$–$C_{12}$perfluoroalkyl ethylthiocarbonylaminoethyl acrylates and -methacrylates, acryloxy- and methacryloxyalkylsiloxanes, N-vinylcarbazole, $C_1$–$C_{12}$alkyl esters of maleic acid, fumaric acid, itaconic acid, mesaconic acid and the like. Preference is given to, for example, $C_1$–$C_4$alkyl esters of vinylically unsaturated carboxylic acids having 3 to 5 carbon atoms or vinyl esters of carboxylic acids having up to 5 carbon atoms.

Examples of suitable hydrophobic vinylic comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris(trimethylsilyloxy)silylpropyl methacrylate, 3-methacryloxypropyl-pentarnethyldisiloxane and bis(methacryloxypropyl)tetramethyldisiloxane.

Suitable hydrophilic vinylic comonomers include, without this being a comprehensive list, hydroxy-substituted lower alkyl acrylates and methacrylates, acrylamide, methacrylamide, lower alkylacrylamides and -methacrylamides, methoxylated acrylates and methacrylates, hydroxy-substituted lower alkylacrylamides and -methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- and 4-vinylpyridine, acrylic acid, methacrylic acid, amino- (where the term "amino" also covers quaternary ammonium), mono(lower alkyl)amino- or di(lower alkyl)amino(lower alkyl) acrylates and methacrylates allyl alcohol and the like. Preference is given to, for example, hydroxy-substituted $C_2$–$C_4$alkyl (meth)acrylates, five- to seven-membered N-vinyllactams, N,N-di-$C_1$–$C_4$alkyl(meth)acrylamides and vinylically unsaturated carboxylic acids having a total of 3 to 5 carbon atoms.

Examples of suitable hydrophilic vinylic comonomers include hydroxyethyl methacrylate, hydroxyethyl acrylate, acrylamide, methacrylamide, dimethylacrylamide, allyl alcohol vinylpyridine, vinylpyrrolidone, glycerol methacrylate, N-(1,1-dimethyl-3-oxobutyl)acrylamide and the like.

Preferred hydrophobic vinylic comonomers are methyl methacrylate and vinyl acetate.

Preferred hydrophilic vinylic comonomers are 2-hydroxyethyl methacrylate, N-vinylpyrrolidone and acrylamide.

The novel prepolymers can be converted into mouldings, in particular contact lenses, in a manner known per so, for example by carrying out the crosslinking of novel prepolymers in a suitable contact-lens mould. The invention therefore furthermore relates to mouldings essentially comprising a novel crosslinked polymer. Further examples of novel mouldings, besides contact lenses, are biomedical mouldings and mouldings for specifically ophthalmic purposes, for example intraocular lenses, eye bandages, mouldings which can be used in surgery, such as heart valves, artificial arteries or the like, furthermore films and membranes, for example membranes for diffusion control, photostructurable films for information storage, and photoresist materials, for example membranes and mouldings for etch resists and screen printing resists.

A specific embodiment of the invention relates to contact lenses which comprise a novel crosslinked polymer made from a prepolymer comprising units of the formula I, II or III or essentially comprise or consist of a novel crosslinked polymer. Contact lenses of this type have a range of unusual and extremely advantageous properties, including, for example, excellent compatibility with the human cornea, based on a balanced ratio between water content (about 50–90% by weight, in particular 60–85% by weight), high oxygen permeability and very good mechanical properties, for example transparency, clarity, freedom from stresses and tear strength. In addition, the novel contact lenses have high dimensional stability. Even after autoclaving one or more times at, for example, about 120° C. for about 30–40 minutes, no changes in shape are observed.

It is furthermore emphasized that the novel contact lenses, ie. those comprising a crosslinked polymer made from a prepolymer comprising units of the formulae I and II, II and III or I, II and III, can be produced very simply and efficiently compared with the prior art. This is due to a number of factors. Firstly, the starting materials, such as the polymer backbones, are inexpensive to obtain or prepare. Secondly, it is advantageous that the prepolymers are surprisingly stable, so that they can be subjected to very substantial purification. The crosslinking can therefore be carried out using a prepolymer which requires virtually no subsequent purification, such as, in particular, complex extraction of unpolymerized constituents. Furthermore, the crosslinking can be carried out in purely aqueous solution, so that a subsequent hydration step is unnecessary. Finally, the crosslinking takes place within less than 5 minutes, so that the process for the production of the novel contact lenses can be designed to be extremely economical from this point of view too.

All the above advantages naturally apply not only to contact lenses, but also to the other mouldings mentioned The totality of the various advantageous aspects in the production of novel mouldings results in novel mouldings being particularly suitable as mass-produced articles, for example as contact lenses, which are worn for a short time span (from about 1 to 4 days) and are then replaced by new lenses.

The present invention furthermore relates to the production of the novel mouldings, in particular the novel contact lenses. These processes are illustrated below using the example of contact lenses. However, these processes can also be used for the other mouldings mentioned.

The novel contact lenses can be produced in a manner known per se, for example in a conventional spin-casting mould, as described, for example, in U.S. Pat. No. 3,408, 429, or by the full-mould process in a static mould, as described, for example, in U.S. Pat. No. 4,347,198.

The present invention also relates to a novel process for the production of polymeric mouldings, in particular contact lenses, in which a water-soluble prepolymer is crosslinked in solution, and to mouldings, in particular contact lenses, obtainable by this process. The mouldings obtainable by crosslinking in this way are insoluble, but swellable, in water.

In detail, this process for the production of mouldings, in particular contact lenses, comprises the following steps:

a) Preparation of an essentially aqueous solution of a water-soluble prepolymer comprising aa) units containing a crosslinkable group and ab) at least one unit containing a modifier of the formula II

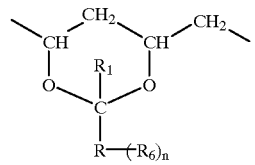

(II)

in which
R$_1$ is hydrogen, a C$_1$–C$_6$alkyl radical or a cycloalkyl radical,
R$_5$ is a monovalent or bivalent radical of the C$_1$–C$_8$alkane or a monovalent or bivalent radical of a C$_2$–C$_8$olefin,
R$_6$ is a group of the formula –(NH—CO—R$_7$)$_o$(R$_8$)$_p$ or —N(R$_9$)$_2$,
R$_7$ is an unsubstituted or substituted monovalent or bivalent radical of a C$_1$–C$_8$alkane,
R$_8$ is a heterocyclic group,
R$_9$ is hydrogen or a C$_1$–C$_6$alkyl radical,
n is zero or 1, and
o and p, independently of one another, are zero or 1;
b) introduction of the resultant solution into a mould,
c) initiation of the crosslinking in water or in an organic solvent in which the water-soluble, crosslinkable polymer is dissolved, and
d) opening of the mould so that the moulding can be removed.

Unless expressly excluded below, the comments and preferences given above in connection with the prepolymers and the comments and preferences given in connection with the processes for the preparation of polymers and production of mouldings, in particular contact lenses, from these prepolymers also apply in connection with the above-described process comprising steps a), b), c) and d).

The crucial criteria regarding whether a polymer can be employed in this crosslinking process are that the prepolymer is soluble in water and contains crosslinkable groups of the formula I or III.

An essentially aqueous solution of a water-soluble prepolymer can be prepared in a manner known per se, for example by isolating the polymer, for example in pure form, ie. free from undesired constituents, and dissolving the prepolymer in an essentially aqueous medium.

The criterion that the prepolymer is soluble in water is, for the purposes of the invention, taken to mean in particular that the prepolymer is soluble in an essentially aqueous solution at 20° C. in a concentration of from about 3 to 90 percent by weight, preferably from about 5 to 60 percent by weight, in particular from about 10 to 60 percent by weight. If possible in individual cases, prepolymer concentrations of greater than 90% are also included for the purposes of the invention. Particular preference is given to prepolymer concentrations in solution of from about 15 to about 50 percent by weight, in particular from about 15 to about 40 percent by weight, for example from about 25 to about 40 percent by weight.

For the purposes of this invention, essentially aqueous solutions of the prepolymer include in particular solutions of he prepolymer in water, in aqueous salt solutions, in particular in aqueous salt solutions having an osmolarity of from about 200 to 450 milliosmol in 1000 ml (unit: mOsm/l), preferably an osmolarity of from about 250 to 350 mOsm/l, in particular about 300 mOsm/l, or in mixtures of water or aqueous salt solutions with physiologically acceptable polar organic solvents, for example glycerol. Preference is given to solutions of the water-soluble crosslinkable polymers in water alone.

The aqueous salt solutions are advantageously solutions of physiologically acceptable salts, such as buffer salts, for example phosphate salts, which are conventional in the area of contact-lens care, or isotonicizing agents, in particular alkali metal halides, for example sodium chloride, which are conventional in the area of contact-lens care, or solutions of mixtures thereof. An example of a particularly suitable salt solution is an artificial, preferably buffered tear fluid whose pH and osmolarity have been matched to natural tear fluid, for example an unbuffered, preferably buffered for example by phosphate buffer, sodium chloride solution whose osmolarity and pH conform to the osmolarity and pH of human tear fluid.

The above-defined, essentially aqueous solutions of the prepolymer are preferably pure solutions, ie. those which are free or essentially free from undesired constituents. Particular preference is given to solutions of the prepolymer in pure water or in an artificial tear fluid as described above.

The viscosity of the solution of the prepolymer in the essentially aqueous solution is unimportant over broad limits. However, it should preferably be a flowable solution which can be shaped without stresses.

The mean molecular weight of the prepolymer is likewise unimportant within broad limits. However, the prepolymer preferably has a molecular weight of from about 10,000 to about 200,000.

The prepolymer used in accordance with the invention must furthermore, as mentioned, contain crosslinkable groups of the formula I or III. The term crosslinkable units or groups is taken to mean, in addition to the groups mentioned, all conventional crosslinkable groups known to the person skilled in the art. Particularly suitable crosslinkable groups are. those which contain carbon-carbon double bonds. However, in order to demonstrate the a variety of crosslinkable groups which are suitable, crosslinking mechanisms which may be mentioned here, merely by way of example, are free-radical polymerization, 2+2 cycloaddition, Diels-Alder reaction, ROMP (ring opening metathesis polymerization), vulcanization, cationic crosslinking and epoxy curing.

Suitable polymeric backbones, in addition to the starting polymers mentioned at the outset, are materials as have in some cases already been proposed as contact-lens materials, for example polymeric diols other than PVA, polymers comprising saccharides, polymers comprising vinylpyrrolidone, polymers comprising alkyl (meth) acrylates, polymers comprising alkyl (meth)acrylates which are substituted by hydrophilic groups, such as hydroxyl, carboxyl or amino groups, polyalkylene glycols, or copolymers or mixtures thereof.

The crosslinkable polymer (prepolymer) used in accordance with the invention comprises the units containing one or more different crosslinkable group(s) and, if desired, the units containing the further modifier(s), reactive dye radicals and photoinitiator radicals, etc, in a total amount of from about 0.5 to 80%, preferably from 1 to 50%, advantageously from 1 to 25%, in particular from 2 to 15%, particularly preferably from 2 to 10%, based on the number of functional groups in the starting polymer, for example hydroxyl groups in the polyvinyl alcohol.

Polymers (prepolymers) which can be crosslinked in accordance with the invention and are intended for the production of contact lenses comprise, in particular, from about 0.5 to about 25%, especially from about 1 to 15%, particularly preferably from about 2 to 12%, of these units.

As already mentioned, for a prepolymer to be suitable in the novel process, it is essential that it is crosslinkable and water-soluble.

Furthermore, the prepolymer is advantageously stable in the uncrosslinked state, so that it can be subjected to purification, as described above in connection with compounds comprising units of the formulae I, II and III. The prepolymers are preferably employed in the novel process in the form of pure solutions. The prepolymers can be converted into the form of pure solutions as described below, for example.

The water-soluble, crosslinkable prepolymers used in the novel process can preferably be purified in a manner known per se, for example by precipitation with organic solvents, such as acetone, filtration and washing, extraction in a suitable solvent, dialysis or ultrafiltration, particular preference being given to ultrafiltration. This purification operation allows the crosslinkable polymers to be obtained in extremely pure form, for example as concentrated aqueous solutions, which are referred to hereinafter as pure or essentially pure. This term is understood to refer to a crosslinkable polymer or to a solution thereof which is free or at least substantially free from undesired constituents.

Undesired constituents in this context are generally all constituents which are physiologically undesired, especially monomeric, oligomeric or polymeric starting compounds used for the preparation of the water-soluble, crosslinkable polymer, or byproducts formed during the preparation of the water-soluble, crosslinkable polymer. Preferred degrees of purity of these constituents are less than 0.01%, in particular less than 0.001%, very particularly preferably less than 0.0001% (1 ppm). It is to be noted, however, that there may be present in the solution, for example by formation as byproducts during the preparation of the water-soluble, crosslinkable polymer, constituents which are not undesired from a physiological point of view, such as for example sodium chloride. Preferred degrees of purity of these constituents are less than 1%, in particular less than 0.1%, very particularly preferably less than 0.01%. In most cases such levels of constituents may be obtained by applying 3 to 4 repeated ultrafiltration cycles.

The preferred process for the purification of the prepolymers used in the novel process, namely ultrafiltration, can be carried out in a manner known per se. The ultrafiltration can be carried out repeatedly, for example from two to ten times. Alternatively, the ultrafiltration can also be carried out continuously until the desired degree of purity has been achieved. The desired degree of purity can in principle be chosen to be as great as desired.

In a preferred embodiment of the crosslinking process, an essentially aqueous solution of the prepolymer which is essentially free from undesired constituents, for example free from monomeric, oligomeric or polymeric starting compounds used for the preparation of the prepolymer, and/or free from by-products formed during the preparation of the prepolymer, is prepared in step a) and used further. This essentially aqueous solution is particularly preferably a purely aqueous solution or a solution in an artificial tear fluid as described above. It is furthermore preferred for the crosslinking process to be carried out without addition of a comonomer, for example a vinylic comonomer.

Owing to the abovementioned measures and in particular owing to a combination of said measures, the novel process is carried out using a solution of the prepolymer containing no or essentially no undesired constituents requiring extraction after crosslinking.

It is therefore a particular feature of this preferred embodiment of the crosslinking process that extraction of undesired constituents is not necessary after the crosslinking.

The novel process is therefore preferably carried out in such a way that the essentially aqueous solution of the prepolymer is free or essentially free from undesired constituents, in particular from monomeric, oligomeric or polymeric starting compounds used for the preparation of the prepolymer, or from by-products formed during the preparation of the prepolymer, and/or that the solution is used without addition of a comonomer.

An addition which may be added to the solution of the prepolymer is a photoinitiator for the crosslinking so long as an initiator is necessary for crosslinking of the crosslinkable groups. This may be the case, in particular, if the crosslinking takes place by photocrosslinking.

In the case of photocrosslinking, it is expedient to add an initiator which is capable of initiating free-radical crosslinking and is readily soluble in water. Examples thereof are known to the person skilled in the art; suitable photoinitiators which may be mentioned specifically are benzoins, such as benzoin, benzoin ethers, such as benzoin methyl ether, benzoin ethyl ether, benzoin isopropyl ether and benzoin phenyl ether, and benzoin acetate; acetophenones, such as acetophenone, 2,2-dimethoxyacetophenone and 1,1-dichloroacetophenone; benzil, benzil ketals, such as benzil dimethyl ketal and benzil diethyl ketal, anthraquinones, such as 2-methylanthraquinone, 2-ethylanthraquinone, 2-tert-butylanthraquinone, 1-chloroanthraquinone and 2-amylanthraquinone; furthermore triphenylphosphine, benzoylphosphine oxides, for example 2,4,6-trimethylbenzoyl-diphenylphosphine oxide, benzophenones, such as benzophenone and 4,4'-bis(N,N'-dimethylamino) benzophenone; thioxanthones and xanthones; acridine derivatives; phenazine derivatives; quinoxaline derivatives and 1-phenyl-1,2-propanedione 2-O-benzoyl oxime; 1-aminophenyl ketones and 1-hydroxyphenyl ketones, such as 1-hydroxycyclohexylphenyl ketone, phenyl 1-hydroxyisopropyl ketone, 4-isopropylphenyl 1-hydroxyisopropyl ketone, 2-hydroxy-1-[4-(2-hydroxyethoxy)phenyl]-2-methylpropan-1-one, 1-phenyl-2-hydroxy-2-methylpropan-1-one, and 2,2-dimethoxy-1,2-diphenylethanone, all of which are known compounds.

Particularly suitable photoinitiators, which are usually used in combination with UV lamps as light source, are acetophenones, such as 2,2-dialkoxybenzophenones and hydroxyphenyl ketones, for example the initiators obtainable under the names IRGACURE®2959 and IRGACURE®1173.

Another class of photoinitiators usually employed when argon ion lasers are used are benzil ketals, for example benzil dimethyl ketal.

The photoinitiators are added in effective amounts, expediently in amounts of from about 0.1 to about 2.0% by weight, in particular from 0.3 to 0.5% by weight, based on the total amount of the prepolymer.

The resultant solution can be introduced into a mould using methods known per se, such as, in particular, conventional metering, for example dropwise. The novel contact lenses can be produced in a manner known per se, for example in a conventional spin-casting mould, as described, for example, in U.S. Pat. No. 3,408,429, or by the full-mould process in a static mould, as described, for example, in U.S. Pat. No. 4,347,198. Appropriate moulds are made, for example, of polypropylene. Examples of suitable materials for reusable moulds are quartz and saphire glass.

The prepolymers which are suitable in accordance with the invention can be crosslinked by irradiation with ionizing or actinic radiation, for example electron beams, X-rays, UV or VIS light, ie. electromagnetic radiation or particle radiation having a wavelength in the range from about 280 to 650 nm. Also suitable are He/Cd, argon ion or nitrogen or metal vapour or NdYAG laser beams with multiplied frequency. It is known to the person skilled in the art that each selected light source requires selection and, if necessary, sensitization of the suitable photoinitiator. It has been recognized that in most cases the depth of penetration of the radiation into the water-soluble, crosslinkable polymer and the rate are in direct correlation with the absorption coefficient and concentration of the photoinitiator.

However, the crosslinking can also be initiated thermally. It should be emphasized that the crosslinking can take place in a very short time in accordance with the invention, for example in less than five minutes, preferably. in less than one minute, in particular in up to 30 seconds, particularly preferably as described in the examples.

Apart from water, which is preferred, the crosslinking medium can additionally be any medium in which the prepolymer is soluble. In the case of polyvinyl alcohol as the principal polymer backbone, all solvents which dissolve polyvinyl alcohol are suitable, such as alcohols, for example ethanol, glycols, glycerol, piperazine (at elevated temperature), diamines, such as triethylenediamine, formamide, dimethylformamide, hexamethylphosphoric triamide, dimethyl sulfoxide, pyridine, nitromethane, acetonitrile, nitrobenzene, chlorobenzene, trichloromethane, dioxane and aqueous solutions of tetraalkylammonium bromide and iodide.

The opening of the mould so that the moulding can be removed can be carried out in a manner known per se. Whereas the process proposed in the prior art (U.S. Pat. Nos. 3,408,429 and 4,347,198) requires subsequent purification steps at this point, for example by extraction, and also steps for hydration of the resultant mouldings, in particular contact lenses, such steps are unnecessary here.

Since the solution of the prepolymer preferably comprises no undesired low-molecular-weight constituents, the crosslinked product also comprises no such constituents. Subsequent extraction is therefore unnecessary. Since the crosslinking is carried out in an essentially aqueous solution, subsequent hydration is unnecessary. These two advantages mean, inter alia, that complex subsequent treatment of the resultant mouldings, in particular contact lenses, is unnecessary. The contact lenses obtainable by the crosslinking process are therefore distinguished, in an advantageous embodiment, by the fact that they are suitable for their intended use without extraction. The term 'intended use' in this connection is taken to mean, in particular, that the contact lenses can be employed in the human eye. The contact lenses obtainable by the crosslinking process are furtherore distinguished in an advantageous embodiment by the fact that they are suitable for their intended use without hydration.

The novel process therefore proves to be extremely suitable for the efficient production of a large number of mouldings, such as contact lenses, in a short time. The contact lenses obtainable by this process have, inter alia, the advantages over the contact lenses known from the prior art that they can be used as intended without subsequent treatment steps, such as extraction or hydration.

The examples below serve to further illustrate the invention. In the examples, unless expressly stated otherwise, amounts are by weight and temperatures are given in degrees celcius. Examples are not intended to represent any restriction of the invention, for example to the scope of the examples.

EXAMPLE 1

220 g (5.5 mol) of sodium hydroxide are dissolved in 300 g of water and 700 g of ice in a 3 liter reactor fitted with stirrer and cooling means. The sodium hydroxide solution is cooled to 10° C., and 526 g (5.0 mol) of aminoacetaldehyde dimethyl acetal and 50 mg of 4-hydroxy-2,2,6,6-tetramethylpiperidine 1-oxide (free-radical inhibitor) are added. 548.6 g (5.5 mol) of methacryloyl chloride are slowly added to this solution at 10° C. over the course of 3.5 hours. When the addition is complete, the pH slowly drops to 7.2, and amine is no longer detectable by GC. The reaction mixture is extracted with 500 ml of petroleum ether in order to remove impurities, and the water phase is saturated with sodium chloride and extracted three times with 500 ml of tert-butyl methyl ether. The organic phase is dried using magnesium sulfate, filtered and evaporated on a rotary evaporator. The 882.2 g of yellowish oil obtained are slowly stirred into 2000 ml of petroleum ether at −10° C. using an Ultraturax. The product crystallizes, and is filtered off and dried, giving 713.8 g of methacrylamidoacetaldehyde dimethyl acetal (86% of theory), melting point 30–32° C. The product is 99.7% pure according to GC.

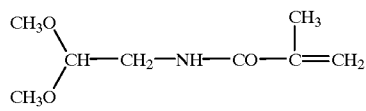

EXAMPLE 2

40 g (1.0 mol) of sodium hydroxide are dissolved in 100 g of water and 200 g of ice in a 1 liter reactor fitted with stirring and cooling means. The sodium hydroxide solution is cooled to 10° C., and 105.1 g (1.0 mol) of aminoacetaldehyde dimethyl acetal and 10 mg of the inhibitor 4hydroxy-2,2,6,6-tetramethylpiperidine 1-oxide are added. 995 g (1.1 mol) of acryloyl chloride are slowly added to this solution at 10° C. over the course of 2 hours. The pH drops slowly and is finally set to pH=7. Amine is no longer present according to GC. The reaction mixture is saturated with sodium chloride and extracted three times with 200 ml of tert-butyl methyl ether. The organic phase is dried, filtered and evaporated on a rotary evaporator. The resultant oil is extracted three times with petroleum ether and subsequently re-dried on a rotary evaporator, giving 130 g of acrylamidoacetaldehyde dimethyl acetal (81% of theory) as an oil. The product is 99% pure according to GC.

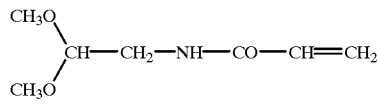

EXAMPLE 3

N-(4,4-Diethoxybutyl)acrylamide.

The preparation is carried out analogously to the procedure of Example 2 from ω-aminobutyraldehyde diethyl acetal and acryloyl chloride. An oil with a purity of 99.1% according to GC is obtained in a yield of 97%.

NMR data: 1.20 ppm (t) 6 methyl protons, 1.62 ppm (broad) 4 methylene protons, 3.21 ppm (dd) 2 methylene protons, 3.49 and 3.68 ppm (m) 4 methoxy protons, 4.50 ppm (t)1 acetal proton, 5.9–6.2 ppm 3 vinyl protons, 6.29 ppm 1 amide proton.

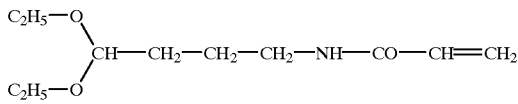

EXAMPLE 4

N-(4,4-Diethoxybutyl)-2-methylacrylamide.

The preparation is carried out analogously to the procedure of Example 1 from ω-aminobutyraldehyde diethyl acetal and methacryloyl chloride. An oil having a purity of 94.7% according to GC is obtained in a yield of 83%.

NMR data: 1.23 ppm (t) 6 methyl protons, 1.65 ppm (broad) 4 methylene protons, 1.95 ppm (s) 3 methyl protons, 3.34 ppm (dd) 2 methylene protons, 3.5 and 3.65 ppm (m) 4 methoxy protons, 4.49 ppm (t) acetal proton, 530 and 5.67 ppm (s) 2 vinyl protons, 6.17 ppm NH proton.

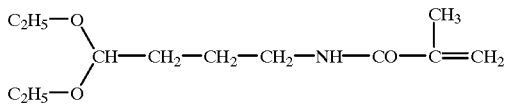

EXAMPLE 5

N-[1-(2,2-Dimethoxyethylcarbamoyl)-1-methylethyl]acrylamide.

62.62 g (0.45 mol) of 4,4-dimethyl-2-vinyl-4H-oxazol-5-one (azalactone) are introduced into 275 g of tert-butyl methyl ether. 47.34 g (0.45 mol) of aminoacetaldehyde dimethyl acetal are slowly added with stirring. The product is formed as a white precipitate, which is filtered off, washed with tert-butyl methyl ether and dried, giving 106 g (96.5% of theory) of a white product of melting point 80–82° C.

| Analysis: | found | calc. |
|---|---|---|
| | C: 54.13% | 54.08% |
| | H: 8.49% | 8.25% |
| | N: 11.42% | 11.47% |

NMR data: 1.60 ppm (s) 6 methyl protons, 3.39 ppm (s) 6 methoxy protons, 3.42 ppm (d) 2 methylene protons, 437 ppm (t) 1-acetal proton, 5.6–6.3 ppm (m) 3 vinyl protons, 6.43 and 6.54 ppm 2 NH protons.

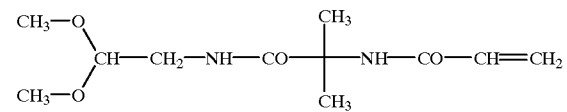

EXAMPLE 6

N-[1-(2,2-Diethoxybutylcarbamoyl)-1-methylethyl]acrylamide.

The product was prepared analogously to Example 5 from ω-aminobutyraldehyde diethyl acetal and azalactone. Yield: 81% of theory. m.p. 60–64° C.

| Analysis: | found | calc. |
|---|---|---|
| | C: 59.83% | 59.98% |
| | H: 9.36% | 9.40% |
| | N: 9.26% | 9.33% |

NMR data: 1.2 ppm (t) 6 methyl protons, 1.61 ppm (s) 6 methyl and 4 methylene protons, 3.30 ppm (d) 2 methylene protons, 3.43–3.69 ppm (m) 4 methylene protons, 4.49 ppm (t) acetal proton, 5.6–6.3 ppm (m) 3 vinyl protons, 652 and 6.69 ppm 2 NH protons.

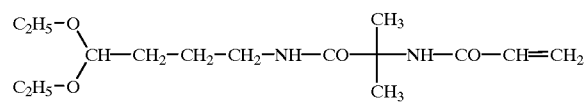

EXAMPLE 7

1-(2,2-Dimethoxyethyl)3,4-dimethylpyrrole-2,5-dione.

84 g (0.66 mol) of dimethylmaleic anhydride are dissolved in 150 ml of toluene, and 70 g (0.66 mol) of aminoacetaldehyde dimethyl acetal are added. The solution is heated to the boil, and the water formed is separated off by means of a water separator. When the reaction is complete, the solvent is removed by distillation, and the residue is distilled, giving 127 g (90% of theory) of the product of boiling point 160° C. at 0.03 mbar which is a single product according to TLC and GC. NMR data: 2.97 (s) 6- methyl protons, 3.34 ppm (s) 6 methoxy protons, 3.61 ppm (d) 2 methyl protons, 4.66 ppm (t) 1 acetal proton.

| Analysis: | found | calc. |
|---|---|---|
| | C: 56.36% | 56.33% |
| | H: 7.12% | 7.09% |
| | N: 6.56% | 6.57% |

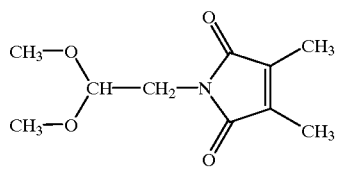

EXAMPLE 8

N-[2,2-Dimethoxyethyl]-2-[3,4dimethyl-2,5-dioxo-2,5-dihydro-pyrrol-1-yl)acetamide.

100 g (0.49 mol) of dimethylmaleimidylacetyl chloride are reacted with 50.2 g (0.49 mol) of aminoacetaldehyde dimethyl acetal analogously to Example 1. Extraction with methylene chloride gives 127.5 g (95% of theory) of crude product. Recrystallization from hot water gives 102 g (77% of theory) of product of m.p. 99.4–99.9° C.

| Analysis: | found | calc. |
|---|---|---|
| | C: 53.40% | 53.33% |
| | H: 6.81% | 6.71% |
| | N: 10.36% | 10.36% |

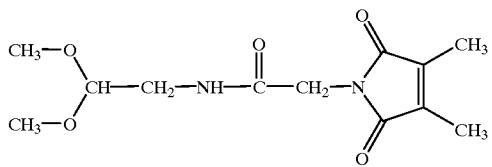

EXAMPLE 9

N-(4,4-Diethoxybutyl)-3,4dimethylpyrrole-2,5-dione.

23.4 g (0.186 mol) of dimethylmaleic anhydride and 30 g (0.186 mol) of ω-aminobutyraldehyde diethyl acetal are reacted analogously to Example 7. Distillation at 106° C. and 0.01 mbar gives 42.2 g (85% of theory) of colourless oil.

| Analysis: | found | calc. |
|---|---|---|
| | C: 62.44% | 62.43% |
| | H: 8.65% | 8.61% |
| | N: 5.12% | 5.20% |

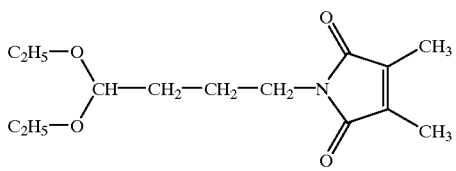

EXAMPLE 10

N-[2,2-Dimethoxyethyl]acetamide.

30.6 g (0.3 mol) of acetic anhydride are added to 315 g (0.3 mol) of aminoacetaldehyd dimethyl acetal in 50 ml of methylene chloride. When the exothermic reaction is complete, the methylene chloride is removed by distillation, the product is distilled, giving 42 g of colourless product (97% of theory), boiling point 110° C., 0.001 mbar. The product is a single compound according to GC

| Analysis: | found | calc. |
|---|---|---|
| | C: 49.14% | 48.97% |
| | H: 8.90% | 8.90% |
| | N: 9.70% | 9.52% |

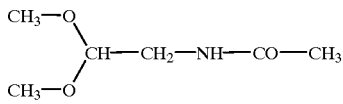

EXAMPLE 11

N-[2,2-Dimethoxyethyl]isobutyramide.

The product is prepared analogously to Example 1 from isobutyryl chloride and aminoacetaldehyde dimethyl acetal. Distillation at 98° C. and 0.01 mbar gives a yield of 77 %. According to GC; the product has a purity of 98%.

| Analysis: | found | calc. |
|---|---|---|
| | C: 54.98% | 54.84% |
| | H: 9.78% | 9.78% |
| | N: 7.94% | 7.99% |

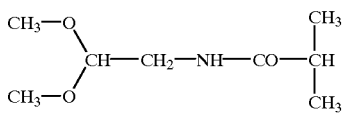

EXAMPLE 12

N-[2,2-Dimethoxyethyl]succinic Monoamide.

50.4 g (0.5 mol) of freshly distilled succinic anhydride are dispersed in 100 ml of methylene chloride. 52.75 g (0.5 mol) of aminoacetaldehyde dimethyl acetal are added, and the mixture is boiled under reflux. After 30 minutes, the homogeneous solution is evaporated in vacuo and freed from solvent at 60° C. under a high vacuum, giving a viscous oil which, according to titration with sodium hydroxide solution, has a purity of 99A %. NMR data: 2.63 ppm (m) 4 methylene protons of succinic acid, 3.42 ppm (s) 6 methoxy protons, 4.42 ppm (t) 1 acetal proton, 3.6 ppm (d) 2 methylene protons, 6.60 ppm (t) 1 amide proton, 9.79 ppm 1 acid proton

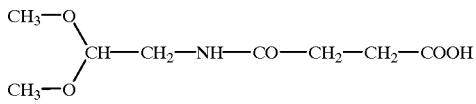

EXAMPLE 13

N-[2,2-Dimethoxyethyl]-3-mercaptopropionamide.

30.8 g (0.25 mol) of methyl mercaptopropionate and 28.7 g (0.27mol) of aminoacetaldehyde dimethyl acetal are introduced into a 250 ml round-bottom flask fitted with Vigreux column and distillation attachment The mixture is kept at 120° C., and the methanol formed is removed by distillation. When the methanol formation is complete, the product is distilled at 180° C. under a water-pump vacuum, giving 26 g (52% of theory) of a colourless oil.

| Analysis: | found | calc. |
|---|---|---|
| | C: 43.65% | 43.50% |
| | H: 7.89% | 7.82% |
| | N: 7.89% | 7.82% |
| | S: 15.29% | 16.59% |

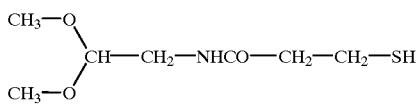

EXAMPLE 14

N-[2,2-Dimethoxyethyl]-3-[2-oxopyrrolidin-1-yl]propionamide.

10 g (62.8 mmol) of the acrylamido acetal from Example 2 are mixed with 6 g (70.5 mmol) of pyrrolidone and, after addition of one drop of Triton B, the mixture is warmed to 80° C. After 10 minutes, the reaction is terminated. The thin-layer chromatogram shows no UV absorbing acetal. The product is subsequently freed from traces of solvent under a high vacuum. It is a single compound according to TLC. NMR data: 2 methylene protons at each of 2.0, 2.4, 2.5, 3.3, 3.4 and 3.6 ppm(t), 6 methoxy protons at 3.35 ppm(s), 1 acetal proton at 4.4 ppm(t), 1 amide proton at 7.2 ppm.

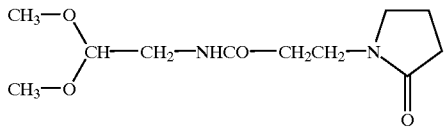

Example 15

General Method for the Preparation of High-Acetate Products of the Reaction of PVA with Acetals or Aldehydes.

300 g of a PVA (Mowiol 4-88, unless stated otherwise) are introduced into a 2 liter twin-jacket reactor fitted with stirrer and thermometer, 800 g of demineralized water are added, and the mixture is warmed to 95° C. with stirring. After one hour, all the reactants have dissolved to give a clear solution, which is cooled to 20° C. A crosslinkable acetal in the amount given in the examples, if desired together with one or more acetal(s), 440 g of acetic acid, 100 g of conc. hydrochloric acid (37%) and sufficient demineralized water to give a total of 200 g of reaction solution are added. The mixture is stirred at 20° C. for 20 hours.

Isolation can be carried out by ultrafiltration: the reaction mixture is cooled to 15° C. and the pH is adjusted to 3.6 by means of aqueous NaOH (5%). The polymer solution is filtered through a 0.45 μm filter and purified by ultrafiltration. The ultrafiltration is carried out using a 1KD Omega membrane from Filtron. The ultrafiltration is continued to a residual sodium chloride content of 0.004%. Before the purification is completed, the solution is adjusted to pH=7 using 0.1 N sodium hydroxide solution. Concentration gives 1995 g of a 1454% polymer solution (92% of theory); N content (Kjendahl determination)=0.683%, acetate content (determined by hydrolysis)=2.34 meq/g, intrinsic viscosity= 0.310, 0.5 meq/g of double bonds (determined by microhydrogenation), 15.3 meq/g of free hydroxyl groups (determined by re-acetylation), GPC analysis (in water): $M_w$=19,101, $M_n$=7522, $M_w/M_n$=2.54.

The isolation can also be carried out by precipitation: the reaction mixture is adjusted to pH 3.6 by means of triethylamine and precipitated in acetone in a ratio of 1:10. The precipitate is separated off, dispersed twice in ethanol and once in acetone and dried. The resultant product has the same properties as that obtained above by ultrafiltration.

EXAMPLE 16

General Method for the Preparation of Low-Acetate Products of the Reaction of PVA with Acetals or Aldehydes.

300 g of a PVA (Mowiol 4-88, unless stated otherwise) are introduced into a 2 liter twin-jacket reactor fitted with stirrer and thermometer, 800 g of demineralized water are added, and the mixture is warmed to 95° C. with stirring. After one hour, all the reactants have dissolved to give a clear solution, which is cooled to 20° C. A crosslinkable acetal in the amount given in the examples, if desired together with one or more acetal(s), 440 g of acetic acid, 100 g of conc. hydrochloric acid (37%) and sufficient demineralized water to give a total of 2000 g of reaction solution are added. The mixture is stirred at 20° C. for 20 hours. After 20 hours, a sample of the reaction solution is titrated with NaOH, and the degree of hydrolysis of the PVA determined: HCl=1.034 meq/g, acetic acid=0.265 meq/g, corresponding to a residual acetate content of 35 mol %. The reaction mixture is stirred at 25° C. for a further two hours and re-titrated: HCl=1.034 meq/g, acetic acid =0.277 meq/g, corresponding to a residual acetate content of 2.93 mol %.

The isolation can also be carried out by ultrafiltration: the reaction mixture is cooled to 15° C. and adjusted to pH 7 using aqueous NaOH (5%). The polymer solution is filtered through a 0.45 μm filter and purified by ultrafiltration. The ultrafiltration is carried out by means of a 1KD Omega membrane from Filtron. The ultrafiltration is continued to a residual sodium chloride content of 0.002%. 1800 g of a 14.02% polymer solution (86% of theory) are obtained; N content (Kjendahl determination)=0.741%, acetate content (according to titration)=0.605 meq/g, corresponding to 2.91 mol %, intrinsic viscosity=0.327, 0.61 meq/g of double bonds (determined by microhydrogenation), 18.13 meq/g of free hydroxyl groups (determined by re-acetylation), GPC analysis (in water): $M_w$=22,007, $M_n$=9743, $M_w/M_n$=2.26.

The isolation can also be carried out by precipitation: the reaction mixture is adjusted to pH 3.6 using triethylamine and precipitated in acetone in a ratio of 1:10. The precipitate is separated off, dispersed twice in ethanol and once in acetone and dried. The resultant product is comparable to that obtained above by ultrafiltration.

EXAMPLES 17a) TO 17b)

Products of the reaction of PVA (Mowiol 3-83, Hoechst), residual acetate content 17 mol %, $M_w$=8261, $M_n$=3646, $M_w/M_n$=2.26, intrinsic viscosity (dl/g)=0.278 by preparation method of Example 15, isolation by ultrafiltration using a 1KD membrane (Millipore):

17a): 30 g of acetal from Example 2,500 g of added acetic acid,

Prepolymer data (sol):
  Intrinsic viscosity: [dl/g]=0.329
  N content 0.79%
  Acetal content: 0.62 meq/g
  Acetate content: 15.3 mol %
  $M_w$: 18,500, $M_n$: 6735, $M_w/M_n$: 2.74
Solids content:
  30% in the sol state result in 30.2% in the gel state.

17b): 30 g of acetal from Example 1, 500 g of added acetic acid,

Prepolymer data (sol):
  Intrinsic viscosity: [dl/g]=0.282
  N content 0.789%
  Acetal content 0.57 meq/g
  Acetate content: 2.81 meq/g, corresponding to 15.1 mol %
  $M_w$: 14,151, $M_n$: 5652, $M_w/M_n$: 2.58
Solids content:
  30% in the sol state result in 30.0% in the gel state.

EXAMPLES 17c) TO e)

Products of the reaction of PVA (Mowiol 26-88, Hoechst), residual acetate content 12 mol %, by the preparation method of Example 15, isolation by ultrafiltration using a 5KD membrane (Millipore):

17c): 7.0 g of acetal from Example 2, 560 g of added acetic acid, 140 g of PVA (26-88) used Prepolymer data (sol):
  Intrinsic viscosity: [dl/g]=0.844
  N content: 0.36%
  Acetal content: 0.255 meq/g
  Acetate content: 12.8 mol %
  $M_w$: 102,341, $M_n$: 37,844, $M_w/M_n$: 2.70
Solids content:
  19.6% in the sol state result in 15.2% in the gel state.

17d): 14 g of acetal from Example 2, 560 g of added acetic acid,
140 g of PVA (26-88) used.

Prepolymer data (sol):
  Intrinsic viscosity: [dl/g]=0.842
  N content: 0.791%
  Acetal content: 0.56 meq/g
  Acetate content: 13.4 mol %
  $M_w$: 78,214, $M_n$: 31,475, $M_w/M_n$: 2.48
Solids content:
  16.6% in the sol state result in 21.4% in the gel state.
  20.3% in the sol state result in 25.8% in the gel state.

17e): A 1:1 mixture of 15% solutions from Examples 17c) and 17d) give a solids content (of the dimensionally stable contact lens) of 17.3% in the gel state resulting from 15% in the sol state. A mixture of this type is suitable for adjusting the solids content and thus the shrinkage of a moulding.

EXAMPLES 18A) TO D)

Products of the reaction of PVA (Mowiol 4-88, Hoechst) with various acetal crosslinking agents by the general preparation method of Example 15, isolation, purification and concentration carried out by ultrafiltration (5KD Millipore membrane):

18a): 37.3 g of acetal from Example 3, 500 g of added acetic acid,

Prepolymer data (sol):
  Intrinsic viscosity: 0.363 dl/g
  N content: 0.77%
  Crosslinking agent content: 055 meq/g
  Acetate content: 12.8 mol %

Solids content:
  30% in the sol state result in
  30.9% in the gel state.
18b): 53.0 g of acetal from Example 4, 500 g of added acetic acid,
Prepolymer data (sol):
  Intrinsic viscosity: 0.324 dl/g
  N content: 0.73%
  Crosslinking agent content: 0.52 meq/g
  Acetate content: 12.7 mol %
Solids content:
  30% in the sol state result in
  29.3% in the gel state.
18c): 56.5 g of acetal from Example 5, 500 g of added acetic acid,
Prepolymer data (sol):
  Intrinsic viscosity: 0.330 dl/g
  N content: 1.43%
  Crosslinking agent content: 0.1 meq/g
  Acetate content: 12.7 mol %
Solids content:
  30% in the sol state result in
  30.0% in the gel state.
18d): 69.36 g of acetal from Example 6, 500 g of added acetic acid,
Prepolymer data (sol):
  Intrinsic viscosity: 0345 dl/g
  N content: 1.43%
  Crosslinking agent content: 0.1 meq/g
  Acetate content: 12.9 mol %
Solids content:
  30% in the sol state result in
  30.15% in the gel state.
18e): 100 g of PVA (Mowiol 488, Hoechst) are dissolved in 334 g of water, and 166 g of methacrylic acid, 166 g of acetic acid and 665 g of conc. hydrochloric acid are added. The reaction mixture is stirred at 40° C. for 5 days in contact with air.
Isolation: After addition of 5% sodium hydroxide solution, the pH is adjusted to 3.6 and the polymer is precipitated by means of NaCl solution. The precipitated polymer is subsequently dissolved in water and purified by ultrafiltration through a 5KD Millipore membrane.
Prepolymer data (sol):
  Intrinsic viscosity: 0.343 dl/g
  Methacrylate content: 7 mol %
  Acetate content: 13 mol %
  GPC data: $M_w=16,550$, $M_n=6631$, $M_w/M_n=2.49$
Solids content:
  30% in the sol state result in
  33.7% in the gel state.
18f): 100 g of PVA (Mowiol 4-88, Hoechst) are dissolved in 334 g of water, and 166 g of acrylic acid, 166 g of acetic acid and 665 g of conc. hydrochloric acid are added. The reaction mixture is stirred at 40° C. for 5 days in contact with air. Isolation: After addition of 5% sodium hydroxide solution, the pH is adjusted to 3.6 and the polymer is precipitated by means of NaCl solution. The precipitated polymer is subsequently dissolved in water and purified by ultrafiltration through a 5KD Millipore membrane.
Prepolymer data (sol):
  Intrinsic viscosity: 0.596 dl/g
  Acrylate content: 9 mol %
  Acetate content: 13 mol %
  GPC data: $M_w=22,383$, $M_n=8121$, $M_w/M_n=2.75$
Solids content:
  30% in the sol state result in
  35.0% in the gel state.

EXAMPLES 19a) TO c)

Products of the reaction of PVA (Mowiol 488, Hoechst) with acetal from Example 1 and modifier acetal from Example 11, preparation method of Example 16, reaction time 12 hours at 20° C., isolation by ultrafiltration:
19a): 56 g of acetal from Example 1 and 56 g of modifier acetal from Example 11, preparation method of Example 16:
Prepolymer data (sol):
  N content: 2.26%
  Total acetal content: 1.61 meq/g
  Acetate content: 65 mol %
  Cloud point: 36° C.
Solids content:
  30% in the sol state result in
  40.1% in the gel state.
19b): 46 g of acetal from Example 1 and 56 g of modifier acetal from Example 11, preparation method of Example 16:
Prepolymer data (sol):
  N content: 2.12%
  Total acetal content: 1.52 meq/g
  Acetate content: 6.6 mol %
  Cloud point: 41° C.
Solids content:
  30% in the sol state result in
  38.2% in the gel state.
19c): 36 g of acetal from Example 1 and 56 g of modifier acetal from Example 11, preparation method of Example 16:
Prepolymer data (sol):
  N content: 1.97%
  Total acetal content: 1.41 meq/g
  Acetate content: 6.0 mol %
  Cloud point: 47° C.
Solids content:
  30% in the sol state result in
  33.5% in the gel state.

EXAMPLES 20a) TO d)

Products of the reaction of PVA (Mowiol 4-88 or 4-98, Hoechst), preparation method of Example 16, with acetal from Example 1 and modifier acetal from Example 10, reaction time 12 hours at 20° C., isolation by ultrafiltration.
20a): 56 g of acetal from Example 1 and 28 g of modifier acetal from Example 10, preparation method of Example 16:
Prepolymer data (sol):
  N content 1.87%
  Crosslinking agent content: 0.97 meq/g
  Total acetal content 133 meq/g
  Acetate content: 65 mol %
  Cloud point: 72° C.

Solids content:
  30% in the sol state result in
  38.5% in the gel state.
20b): 56 g of acetal from Example 1 and 56 g of modifier acetal from Example 10, preparation method of Example 16:
Prepolymer data (sol):
  N content: 2.61%
  Crosslinking agent content: 0.97 meq/g
  Total acetal content: 1.87 meq/g
  Acetate content: 55 mol %
  Cloud point: 61° C.
Solids content:
  30% in the sol state result in
  36% in the gel state.
20c): 56 g of acetal from Example 1 and 100 g of modifier acetal from Example 10, preparation method of Example 16:
Prepolymer data (sol):
  N content: 3.11%
  Crosslinking agent content: 1.1 meq/g
  Total acetal content. 2.23 meq/g
  Acetate content: 7.1 mol %
  Cloud point: 46° C.
Solids content:
  30% in the sol state result in
  37.0% in the gel state.
20d): 26 g of acetal from Example 1 and 96 g of modifier acetal from Example 10, preparation method of Example 16 using PVA (Mowiol 4-98, Hoechst):
Prepolymer data (sol):
  N content 2A8%
  Crosslinking agent content: 0.34 meq/g
  Total acetal content: 1.78 meq/g
  Acetate content: 0.8 mol %
  Intrinsic viscosity: 0345 [dl/g]
Solids content:
  30% in the sol state result in
  28.1% in the gel state.

EXAMPLES 21a) TO d)

Products of the reaction of PVA (Mowiol 4-88, Hoechst), preparation method of Example 16 with acetal from Example 1 and the acidic modifier acetal from Example 12, reaction time 12 hours at 20° C., isolation by ultrafiltration (3KD membrane):

21 a): 56 g of acetal from Example 1 and 24 g of acidic modifier acetal from Example 12, preparation method of Example 16:
Prepolymer data (sol):
  N content: 1.66%
  Crosslinking agent content: 0.96 meq/g
  Total acetal content: 1.19 meq/g
  Acetate content: 7.2 mol %
Solids content:
  30% in the sol state result in
  32.7% in the gel state.
21b): 39 g of acetal from Example 1 and 25 g of acidic modifier acetal from Example 12, preparation method of Example 16:
Prepolymer data (sol):
  Intrinsic viscosity: 0.423 [dl/g]
  N content: 1.32%
  Crosslinking agent content: 0.62 meq/g
  Acid content: 0.32 meq/g
  Acetate content: 7.8 mol %
Solids content:
  30% in the sol state result in
  32.6% in the gel state.
21c): 30 g of acetal from Example 1 and 24 g of acidic modifier acetal from Example 12, preparation method of Example 15 using 500 g of acetic acid, reaction time 24 hours:
Prepolymer data (sol):
  Intrinsic viscosity: 0.331 [dl/g]
  N content: 1.18%
  Crosslinking agent content: 0.52 meq/g
  Acid content: 035 meq/g
  Acetate content: 103 mol %
Solids content:
  30% in the sol state result in
  27.0% in the gel state.
21d): 20 g of acetal from Example 1 and 24 g of acidic modifier acetal from Example 12, preparation method of Example 16, reaction time 9 hours:
Prepolymer data (sol):
  Intrinsic viscosity: 0.390 [dl/g]
  N content: 0.994%
  Crosslinking agent content: 0.35 meq/g
  Acid content: 0.35 meq/g
  Acetate content 8.0 mol %

EXAMPLES 22a) AND b)

Products of the reaction of PVA (Mowiol 488, Hoechst) with acetal from Example 1 and aminobutyraldehyde diethyl acetal, preparation method of Example 16, isolation by ultrafiltration:

22a): 39 g of acetal from Example 1 and 20 g of ω-aminobutyraldehyde diethyl acetal, preparation method of Example 16, reaction time 9 hours:
Prepolymer data (sol):
  Intrinsic viscosity: 0.423 [dl/g]
  N content: 1.37%
  Crosslinking agent content: 0.64 meq/g
  Amine content: 0.35 meq/g
  Acetate content: 10.0 mol %
Solids content:
  30% in the sol state result in
  30.6% in the gel state.
22b): 30 g of acetal from Example 1 and 5.2 g of ω-aminobutyraldehyde diethyl acetal, preparation method of Example 15, 500 g of added acetic acid, reaction time 24 hours:
Prepolymer data (sol):
  Intrinsic viscosity: 0.339 dl/g
  N content: 0.89%
  Crosslinking agent content: 0.54 meq/g
  Amine content: 0.10 meq/g
  Acetate content 12.0 mol %
Solids content:
  30% in the sol state result in
  29.6% in the gel state.

EXAMPLES 23a) AND b)

Products of the reaction of PVA (Mowiol 4-88, Hoechst) with acetal from Example 1 and crotonaldehyde or butyraldehyde, preparation method of Example 16, isolation by ultrafiltration.

23a): 30 g of acetal from Example 1 and 19.1 g of butyraldehyde, preparation method of Example 16, reaction time 20 hours at 25° C.:

Prepolymer data (sol):
Intrinsic viscosity: 0.310 dl/g
N content: 0.78%
Crosslinking agent content: 056 meq/g
Acetate content: 2.8 mol %
GPC: $M_w$=22,203, $M_n$=6505, $M_w/M_n$=3.41
Solids content:
30% in the sol state result in
32.6% in the gel state.

23b): 30 g of acetal from Example 1 and 18.6 g of crotonaldehyde, preparation method of Example 16, reaction time 20 hours at 25° C.:

Prepolymer data (sol):
Intrinsic viscosity: 0390 dl/g
N content: 0.78%
Crosslinking agent content: 0.56 meq/g
Acetate content: 3.0 mol %
GPC: $M_w$=41,094, $M_n$=15,014, $M_w/M_n$=2.73
Solids content:
30% in the sol state result in
30.0% in the gel state.

EXAMPLE 24

Products of the reaction of PVA (Mowiol 488, Hoechst) with acetal from Example 1 and the pyrrolidone acetal from Example 14, preparation method of Example 15, isolation by ultrafiltration:

32 g of acetal from Example 1 and 64 g of pyrrolidone acetal from Example 14, 100 g of added acetic acid Prepolymer data (sol):
Intrinsic viscosity: 0.340 dl/g
N content 2.72%
Crosslinking agent content: 0.52 meq/g
Acetate content: 6.0 mol %
Solids content:
30% in the sol state result in
29.8% in the gel state.

EXAMPLES 25a) AND b)

Products of the reaction of copolymers of vinyl acetate and vinylpyrrolidone (Luviskol, BASF) with acetal from Example 1, isolation by ultrafiltration using a 1KD ultrafiltration membrane (Millipore).

General preparation method, apparatus as in Example 16

25a): 109.5 g of HCl (37%) are added to 500 g of Luviskol VA 37 HM 50% in ethanol, from BASF. 486 g of water are slowly added over the course of 4 hour, and the mixture is stirred at 40° C. for 24 hours. The ethyl acetate formed and the alcohol are removed in vacuo (15 mbar) in the course of 25 hours and replaced by water. The mixture is cooled to room temperature, 16.25 g of acetal from Example 1 are added, and the mixture is stirred at 20° C. for 20 hours.

Isolation by ultrafiltration after neutralization of the reaction solution to pH 7.0 using NaOH.

425 g of a 13.59% polymer solution (82% of theory) are obtained.

Prepolymer data (sol):
Intrinsic viscosity: 0509 dl/g
N content: 6.22%
Crosslinking agent content: 2.8 mol %
Acetate content: 0.26 meq/g
GPC data: $M_w$ 186,102, $M_n$ 8497, $M_w/M_n$ 21.9
Solids content:
(after exposure to 80 mW/cm$^2$ for 6 seconds)
30% in the sol state result in
43.1% in the gel state 25b): 405 g of Luviskol VA37E (BASF), 50% in ethanol, are treated analogously to Example 25a with 88.7 g of HCl (37%) at 40° C. for 7 hours. After the solvent has been removed in vacuo and replaced by water, 20 g of acetal from Example 1 are added. After 20 hours at room temperature, the mixture is neutralized and purified by ultrafiltration (1KD membrane).

Prepolymer data (sol):
N content: 5.45%
Crosslinking agent content: 4.2 mol %
GPC data: $M_w$ 38,143, $M_n$ 7816, $M_w/M_n$ 4.88
Solids content:
(after exposure at 80 mW/cm$^2$ for 6 seconds)
30% in the sol state result in
34.1% in the gel state 25c): 263 g of Mowilith 30 (Hoechst) are swollen overnight in 500 g of methanol and then warmed to 50° C. When the polymer has dissolved completely, 100 g of conc. hydrochloric acid are slowly added at 40° C., and 530 g of water are subsequently added over the course of 2 hours at such a rate that no cloudiness forms. The methanol is removed over a further 2 hours at 40° C. under a water-pump vacuum. The solution is cooled to 20° C., and 23 g of the acetal from Example 1 are added. After a reaction time of 16 hours at room temperature, the solution is adjusted to pH=4 using 5% sodium hydroxide solution. Purification is by ultrafiltration through a 1KD Filtron membrane.

Prepolymer data (sol):
Intrinsic viscosity: 0.344 dl/g
N content: 0.79%
Crosslinking agent content: 0.57 meq/g
Acetate content: 20.1 mol %
Cloud point: 61° C.
Solids content:
30% in the sol state result in
32.9% in the gel state

EXAMPLE 26

Production of Contact Lenses via Crosslinking a) Free-radical photocrosslinking:

0.3% (based on the polymer content) of the photoinitiator Irgacure 295.9 is added to a 30% solution of the polymers from Examples 17a to 25c) inclusive. In a transparent polypropylene contact-lens mould, the solutions are exposed to a 200 W Oriel UV lamp (150 mW/cm$^2$) for 6 seconds. The lenses are removed from the mould. They are transparent.

b) Photodimerization:

Products of the reaction of PVA (Mowiol 4-88, Hoechst) with various photodimerizing acetals by the general preparation method from Example 16, isolation, purification and concentration by ultrafiltration (5KD Millipore membrane):

b1) 15 g of the acetal from Example 7 and 30 g of conc. hydrochloric acid are added to 50 g of PVA (Mowiol 488, Hoechst) dissolved in 250 g of water. The mixture is stirred at 20° C. and, after 24 hours, adjusted to pH 3.6 using 5% sodium hydroxide solution. The solution is subjected to ultrafiltration through a 5KD Millipore membrane (polymer yield 81%).

Prepolymer data (sol):

Intrinsic viscosity: 0.463 dl/g

N content: 1.11%

Crosslinking agent content: 0.8 meq/g

Acetate content: 1.9 mol %

Crosslinking:

a 30% polymer solution is sensitized by means of 5% of sodium 2-phenylquinoxaline4sulfonate and exposed for 5minutes (83 mW/cm³, giving a hydrogel with 6.6% expansion.

b2) 30 g of the acetal from Example 8 and 60 g of conc. hydrochloric acid are added to 100 g of PVA (Mowiol 4-88, Hoechst) dissolved in 500 g of water. The mixture is stirred at 20° C. and, after 24 hours, adjusted to pH 3.6 using 5% sodium hydroxide solution. The solution is subjected to ultrafiltration through a 5KD Millipore membrane (polymer yield 79.5%).

Prepolymer data (sol):

Intrinsic viscosity: 0.367 dl/g

N content: 2.7%

Crosslinking agent content: 0.96 meq/g

Acetate content: 23 mol %

Crosslinking:

a 30% polymer solution is sensitized by means of 5% of sodium 2-phenylquinoxaline-4sulfonate and exposed for 5 minutes (83 mW/cm²), giving a hydrogel with 5.3% expansion.

c) Thermal Crosslinking (by Oxidation):

Products of the reaction of PVA (Mowiol 488, Hoechst) with the thiol-containing acetal from Example 13, preparation method of Example 15, isolation by ultrafiltration. 33.4 g of the acetal from Example 13, 440 g of added acetic acid, no acetal crosslinking agent.

Prepolymer data (sol):

Intrinsic viscosity: 0382 dl/g

Modifier content: 2.3 mol %

Acetate content: 11.0 mol %

GPC: $M_w$ 35,250, $M_n$ 6934, $M_w/M_n$ 5.08.

Solids content:

Polymer is not photosensitive, crosslinks thermally.

This example clearly shows that a thiol group is a crosslinkable group.

What is claimed is:

1. A prepolymer which is a derivative of a polyvinyl alcohol having a mean molecular weight of at least about 2000 which comprises from about 0.5 to about 80%, based on the number of hydroxyl groups in the polyvinyl alcohol, of units of the formula II and units selected from the group consisting of units of formula I and II:

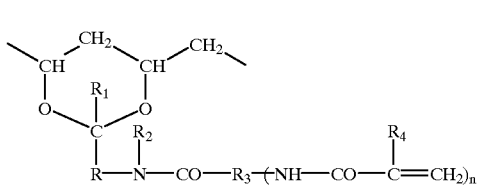

in which

R is a bivalent radical of a $C_1$–$C_{12}$alkane, $R_1$ is hydrogen, a $C_1$–$C_6$alkyl radical or a cycloalkyl radical, $R_2$ is hydrogen or a $C_1$–$C_6$alkyl radicals $R_3$ is the

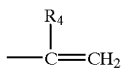

group if n=0, or the

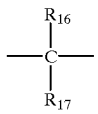

bridge if n=1, $R_4$ is hydrogen or $C_1$–$C_4$alkyl, n is zero or 1 and $R_{16}$ and $R_{17}$, independently of one another, are hydrogen, $C_1$–$C_8$alkyl, aryl or cyclohexyl;

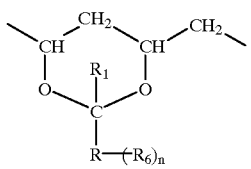

in which $R_1$ is hydrogen, a $C_1$–$C_6$alkyl radical or a cycloalkyl radical, $R_5$ is a monovalent or bivalent radical of a $C_1$–$C_8$alkane or a monovalent or bivalent radical of a $C_2$–$C_8$olefin, $R_6$ is a group of the formula –(NH—CO—$R_7$)$_o$($R_8$)$_p$ or —N($R_9$)$_2$, $R_7$ is an unsubstituted or substituted monovalent or bivalent radical of a $C_1$–$C_8$alkane, $R_8$ is a heterocyclic group, $R_9$ is hydrogen or a $C_1$–$C_6$alkyl radical,
n is zero or 1, and
o and p, independently of one another, are zero or 1;

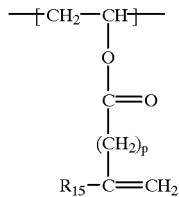
(III)

in which $R_{15}$ is hydrogen or a $C_1$–$C_4$alkyl group, in particular $CH_3$, and p is from zero to 6.

2. A prepolymer according to claim 1, which comprises units of the formulae I and II.

3. A prepolymer according to claim 1, which comprises units of the formula III.

4. A prepolymer according to claim 1, wherein n=0.

5. A prepolymer according to claim 1, wherein p=0.

\* \* \* \* \*